US008649927B2

(12) United States Patent
Gustavsson

(10) Patent No.: US 8,649,927 B2
(45) Date of Patent: Feb. 11, 2014

(54) ENERGY SYSTEM FOR A HYBRID VEHICLE

(75) Inventor: Roger Gustavsson, Örnsköldsvik (SE)

(73) Assignee: El-Forest AB, Arnäsvall (SE)

( * ) Notice: Subject to any disclaimer, the term of this patent is extended or adjusted under 35 U.S.C. 154(b) by 249 days.

(21) Appl. No.: 13/318,988

(22) PCT Filed: May 12, 2009

(86) PCT No.: PCT/EP2009/055711

§ 371 (c)(1), (2), (4) Date: Nov. 4, 2011

(87) PCT Pub. No.: WO2010/130284

PCT Pub. Date: Nov. 18, 2010

(65) Prior Publication Data

US 2012/0053773 A1 Mar. 1, 2012

(51) Int. Cl.
*B60K 6/00* (2007.10)

(52) U.S. Cl.
USPC .................. 701/22; 701/36; 701/50; 60/698; 60/706; 123/319; 180/165

(58) Field of Classification Search
None
See application file for complete search history.

(56) References Cited

U.S. PATENT DOCUMENTS 6,292,726 B1 * 9/2001 Gustavsson .................... 701/36
6,615,118 B2 * 9/2003 Kumar ........................... 701/19
6,666,022 B1 * 12/2003 Yoshimatsu et al. ............ 60/413
6,678,972 B2 * 1/2004 Naruse et al. ................... 37/466
6,708,787 B2 * 3/2004 Naruse et al. ................ 180/53.8
6,725,581 B2 * 4/2004 Naruse et al. ................... 37/348
6,745,117 B1 * 6/2004 Thacher et al. ................. 701/50
6,789,335 B1 * 9/2004 Kinugawa et al. .............. 37/348
6,864,663 B2 * 3/2005 Komiyama et al. ........... 320/104

(Continued)

FOREIGN PATENT DOCUMENTS

JP 2003-028071 1/2003
JP 2005-133319 5/2005

(Continued)

OTHER PUBLICATIONS

Suero Gallego, V, International Preliminary Report on Patentability for parent PCT/EP2009/055711, European Patent Office, Netherlands, Sep. 8, 2011.

(Continued)

*Primary Examiner* — Jonathan M. Dager
(74) *Attorney, Agent, or Firm* — Babcock IP, PLLC

(57) ABSTRACT

A method of controlling operation of an energy system for a hybrid vehicle, the energy system including a combustion engine controlled to work at a desired engine rotational speed; an electric generator/motor driven by the combustion engine to output a generated electric power; a power consuming device driven by the combustion engine and drivable by the electric generator/motor; and an energy storage device connected to the electric generator/motor and arranged to receive the generated electric power output by the electric generator/motor. The method includes the steps of: monitoring an actual engine rotational speed; and if the actual engine rotational speed decreases from the desired engine rotational speed, controlling the electric generator/motor to output a gradually reducing generated electric power. Hereby, the combustion engine can be allowed to remain in an operating range where it works efficiently, while at the same time fulfilling the need for power of the power consuming device.

14 Claims, 3 Drawing Sheets

(56) References Cited

U.S. PATENT DOCUMENTS

| | | | | |
|---|---|---|---|---|
| 7,069,673 | B2 * | 7/2006 | Kagoshima et al. | 37/348 |
| 7,086,226 | B2 * | 8/2006 | Oguri | 60/414 |
| 7,308,958 | B2 * | 12/2007 | Tamor et al. | 180/65.1 |
| 7,388,301 | B2 * | 6/2008 | Komiyama et al. | 290/40 C |
| 7,487,023 | B2 * | 2/2009 | Komiyama et al. | 701/50 |
| 7,525,206 | B2 * | 4/2009 | Kagoshima et al. | 290/40 C |
| 7,728,449 | B2 * | 6/2010 | Kagoshima et al. | 290/40 C |
| 7,757,797 | B2 * | 7/2010 | Döbereiner | 180/65.31 |
| 7,950,481 | B2 * | 5/2011 | Betz et al. | 180/65.31 |
| 7,980,073 | B2 * | 7/2011 | Jensen | 60/414 |
| 8,136,271 | B2 * | 3/2012 | Sakai et al. | 37/348 |
| 8,175,790 | B2 * | 5/2012 | Stemler et al. | 701/110 |
| 8,408,341 | B2 * | 4/2013 | Dalum et al. | 180/65.22 |
| 2001/0052433 | A1 | 12/2001 | Harris | |
| 2004/0088103 | A1 * | 5/2004 | Itow et al. | 701/110 |
| 2004/0222000 | A1 * | 11/2004 | Ohtsukasa | 172/2 |
| 2007/0187180 | A1 * | 8/2007 | Kagoshima et al. | 182/232 |
| 2008/0093865 | A1 * | 4/2008 | Komiyama et al. | 290/40 A |
| 2008/0264051 | A1 * | 10/2008 | Ericson et al. | 60/327 |
| 2010/0031650 | A1 * | 2/2010 | Morinaga et al. | 60/459 |

FOREIGN PATENT DOCUMENTS

| | | |
|---|---|---|
| JP | 2007-153561 | 6/2007 |
| JP | 2008-248885 | 10/2008 |
| JP | 2008-295244 | 12/2008 |
| WO | 2008041890 | 4/2008 |

OTHER PUBLICATIONS

English Translation of Office Action for Counterpart Japan Application No. 2012-510121, Dispatch No. 452019, Jul. 9, 2013.

* cited by examiner

ENERGY SYSTEM FOR A HYBRID VEHICLE

TECHNICAL FIELD OF THE INVENTION

The present invention relates to a method and device for controlling operation of an energy system for a hybrid vehicle, and to such a hybrid vehicle.

TECHNICAL BACKGROUND

As a part of the ongoing effort to reduce the emission of greenhouse gases into the atmosphere, more energy-efficient vehicles are currently being developed.

One class of such vehicles are so-called hybrid vehicles, that are provided with an energy system with a combustion engine, an electric generator/motor and an energy storage device, such as batteries or capacitors. By intelligently using the energy stored in the energy storage device, the combustion engine can be run more efficiently, which leads to a reduction in the amount of $CO_2$ per kilometer that is emitted by the hybrid vehicle.

Hybrid vehicles in the form of cars are abundant on the market today. However, hybrid vehicles in the form of construction equipment and other utility vehicles provided with an additional substantial power consuming device, such as a hydraulic lifting system are scarcely found.

SUMMARY OF THE INVENTION

In view of the above, a general object of the present invention is to provide for energy efficient operation of a hybrid vehicle comprising a substantial power consuming device, such as a hydraulic lifting system.

According to a first aspect of the present invention, these and other objects are achieved through a method of controlling operation of an energy system for a hybrid vehicle, the energy system comprising: a combustion engine being controlled to work at a desired engine rotational speed; an electric generator/motor arranged to be driven by the combustion engine to output a generated electric power; a power consuming device arranged to be driven by the combustion engine and drivable by the electric generator/motor; and an energy storage device connected to the electric generator/motor and arranged to receive the generated electric power output by the electric generator/motor, wherein the method comprises the steps of: monitoring an actual engine rotational speed; and if the actual engine rotational speed decreases from the desired engine rotational speed, controlling the electric generator/motor to output a gradually reducing generated electric power.

It should be noted that the method according to the present invention by no means is limited to performing the steps thereof in any particular order.

In the development of an energy system for a hybrid vehicle comprising a substantial power consuming device, new challenges have been encountered by the present inventor. For example, unpredictable demand of power from the power consuming device may lead to a total demand for more power than can be generated by the combustion engine, which may then stall.

An obvious solution to this problem would be to provide a larger combustion engine, but with such a solution the advantages of the hybrid vehicle, such as the increased energy-efficiency, are not fully realized. Furthermore, an over-dimensioned combustion engine adds to the cost of the hybrid vehicle.

In view of these new challenges faced by the present inventor, the present invention is based on the realization that energy efficient operation of a hybrid vehicle with a substantial power consuming device can be achieved by monitoring the actual engine rotational speed, and, if the actual engine rotational speed decreases from the desired engine rotational speed, which will be the case if power is required by the power consuming device, gradually reduce the generated electric power output by the electric generator/motor.

The gradual reduction of the generated electric power output by the electric generator/motor may be continuous or step-wise. For example, values indicative of the actual engine rotational speed and corresponding values indicative of the generated electric power may be provided in a look-up table, which may then be used to control the electric generator/motor based on sensed values indicative of the actual engine rotational speed.

The electric generator/motor can be controlled to rapidly reduce its output of generated electric power and closely follow the decrease in the actual engine rotational speed, whereby the load to be driven by the combustion engine can be reduced sufficiently fast to allow the engine to continue running, and not to stall.

Hereby, the combustion engine can be allowed to remain in an operating range where it works efficiently, while at the same time fulfilling the need for power of the power consuming device.

Furthermore, various embodiments of the method of the present invention allows for the combustion engine to be dimensioned for a substantially lower peak output power than the sum of the predicted loads of the electric generator/motor and the power consuming device. This provides for a reduced $CO_2$-emission and a lower cost of the energy system.

The above-mentioned desired engine rotational speed may generally be selected to be an engine rotational speed at which the combustion engine has its peak efficiency, and the combustion engine may typically have an engine control system regulating the engine towards the desired engine rotational speed. Such control systems are, per se, well-known in the art.

When the load on the combustion engine fluctuates, the engine rotational speed will typically also fluctuate, the fluctuating engine rotational speed being the actual engine rotational speed. In response to such fluctuations, the engine control system will typically strive to return the engine to the desired engine rotational speed.

The method according to the present invention may further comprise the step of controlling the electric generator/motor to output a gradually increasing generated electric power, if the actual engine rotational speed is increasing towards the desired engine rotational speed, whereby efficient utilization of the power delivered by the combustion engine is provided for.

According to various embodiments thereof, the method of the present invention may advantageously further comprise the step of controlling the electric generator/motor to function as an electric motor, drawing electric power from the energy storage device and supplying mechanical power to the power consuming device if the actual engine rotational speed is lower than a predetermined threshold engine rotational speed.

Hereby, the engine can be allowed to continue to work and deliver mechanical power to the power consuming device even if the power consuming device requires more power than the combustion engine is capable of delivering, the additional mechanical power being provided by the electric generator/motor.

This allows for an even more lean dimensioning of the combustion engine, in that it may be dimensioned to provide substantially less power than may be required by the power consuming device, at least intermittently. From this follows that the energy system, and hence the hybrid vehicle, can be made even more energy-efficient and at a reduced cost.

According to a second aspect of the present invention, the above-mentioned and other objects are achieved through a controller for controlling operation of an energy system of a hybrid vehicle, the energy system comprising: a combustion engine controllable to work at a desired engine rotational speed; an electric generator/motor arranged to be driven by the combustion engine to output a generated electric power; a power consuming device arranged to be driven by the combustion engine and drivable by the electric generator/motor; and an energy storage device connected to the electric generator/motor and arranged to receive the generated electric power output by the electric generator/motor, the controller being configured to: monitor an actual engine rotational speed; and if the actual engine rotational speed decreases from the desired engine rotational speed, control the electric generator/motor to output a gradually reducing generated electric power.

The controller may be provided in the form of hardware, software or a combination thereof, and the method according to the first aspect of the present invention may be embodied in hardware in the controller, as a computer program adapted to run on a microprocessor comprised in the controller, or as a combination thereof.

For monitoring the actual engine rotational speed, the controller may have an input for acquiring data indicative of the actual engine rotational speed. The data may typically originate from a sensor sensing the actual engine rotational speed. Such sensors are well-known to the skilled person. Furthermore, the actual engine rotational speed may be monitored by directly monitoring the rotational speed of the crank shaft of the combustion engine or indirectly by monitoring other rotating parts of the energy system, such as the rotor comprised in the electric generator/motor or one or several of the shafts or other power transmitting member(s) that may mechanically connect the combustion engine with the electric generator/motor and the power consuming device.

As was described above in connection with the first aspect of the present invention, the controller may further be configured to control the electric generator/motor to function as an electric motor, drawing electric power from the energy storage device and supplying mechanical power to the power consuming device if the actual engine rotational speed is lower than a predetermined threshold engine rotational speed.

To this end, the controller may be configured to compare the actual engine rotational speed with the predetermined threshold engine rotational speed and, if the actual engine rotational speed is determined to be lower than the threshold engine rotational speed, reverse operation of the electric generator/motor. It will be well-known to the skilled person how to switch an electric generator/motor from a generator state to a motor state.

Further embodiments of, and effects obtained through this second aspect of the present invention are largely analogous to those described above for the first aspect of the invention.

Moreover, the controller according to the present invention may advantageously be included in an energy system for a hybrid vehicle, the energy system further comprising: a combustion engine controllable to work at a desired engine rotational speed; an electric generator/motor arranged to be driven by the combustion engine to output a generated electric power; a power consuming device arranged to be driven by the combustion engine and drivable by the electric generator/motor; and an energy storage device connected to the electric generator/motor and arranged to receive the generated electric power output by the electric generator/motor.

The electric generator/motor and the power consuming device may be mechanically connected to the combustion engine to be driven by the combustion engine at the actual engine rotational speed.

Moreover, the combustion engine, the electric generator/motor and the power consuming device may be arranged in an in-line arrangement and may be interconnected with shafts.

According to various embodiments, the power consuming device may be a pump for a hydraulic system, such as a hydraulic lifting system.

Furthermore, the energy system according to various embodiments of the present invention may advantageously be comprised in a hybrid vehicle, further comprising a set of driving wheels; at least one driving electric motor for driving the set of driving wheels, the electric motor being arranged to receive electric power from the energy storage device comprised in the energy system of the hybrid vehicle.

In various embodiments, the hybrid vehicle may comprise a plurality of individually controllable driving electric motors, each being arranged to drive a corresponding one of the driving wheels.

The hybrid vehicle may further comprise a hydraulic system arranged to be powered by the power consuming device comprised in the energy system of the hybrid vehicle.

In various embodiments, this hydraulic system may comprise a hydraulic lifting tool, such as an excavator bucket or a grabbing tool for a forwarder used in forestry.

According to a further aspect, the above-mentioned and other objects are also achieved by a computer program enabling execution of the steps of the method according to the first aspect of the invention when run on a controller according to the second aspect of the invention. Such a computer program may thus be a stand-alone computer program, or an upgrade, enabling an existing computer program to execute the steps of the method according to the present invention.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF A PREFERRED EMBODIMENT OF THE INVENTION

In the present detailed description, various embodiments of the control method, controller and energy system according to the present invention are mainly discussed with reference to an energy system comprised in a forwarder used in forestry. It should be noted that this by no means limits the scope of the present invention, which is equally applicable to an energy system for use in any other hybrid vehicle, such as hybrid-powered construction equipment, including excavators and dumpers.

Figure 1:
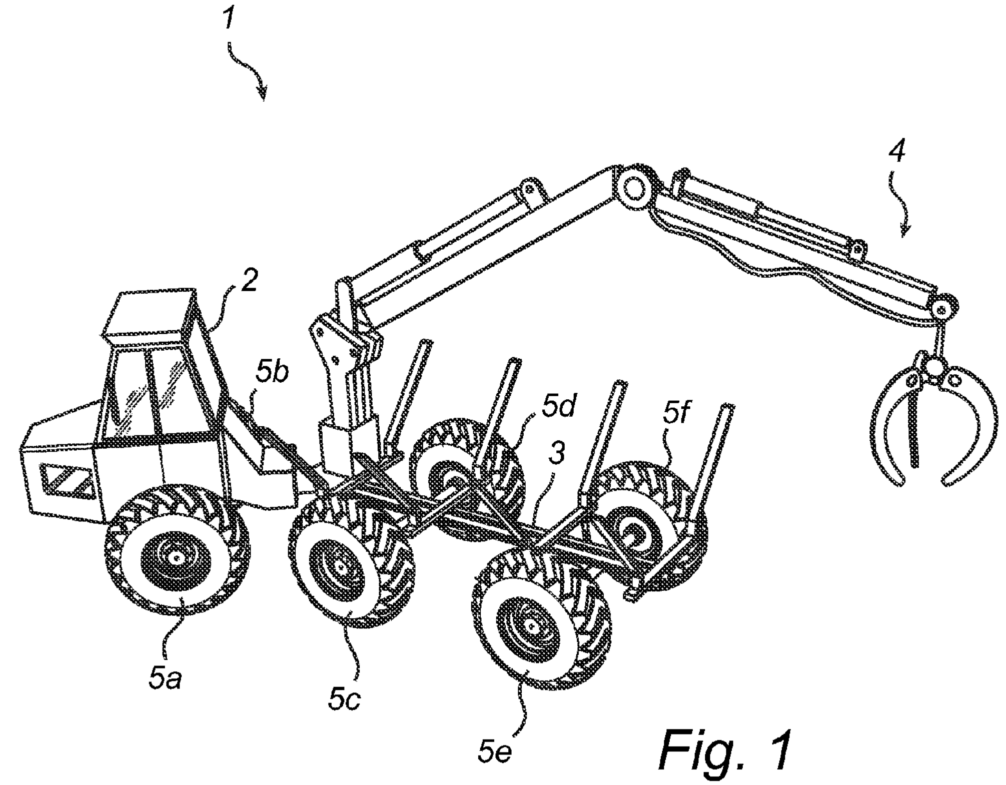
FIG. 1 schematically illustrates an exemplary hybrid vehicle according to an embodiment of the present invention, in the form of a forwarder for use in forestry.

FIG. 1 schematically illustrates an exemplary hybrid vehicle in the form of a forwarder 1 for use in forestry.

The hybrid forwarder 1 comprises a cabin 2, a bed 3 for holding harvested timber, a hydraulic grabbing tool 4 for enabling the operator of the forwarder 1 to lift harvested timber from the ground to the bed 3 of the forwarder 1. The hybrid forwarder 1 is further provided with six wheels 5*a-f*, each being driven by an associated individually controllable electric motor (not shown in FIG. 1). The electric motors driving the wheels 5*a-f* and the hydraulic grabbing tool 4 are powered by an energy system which is not visible in FIG. 1, but will be described in more detail below with reference to FIG. 2.

Figure 2:
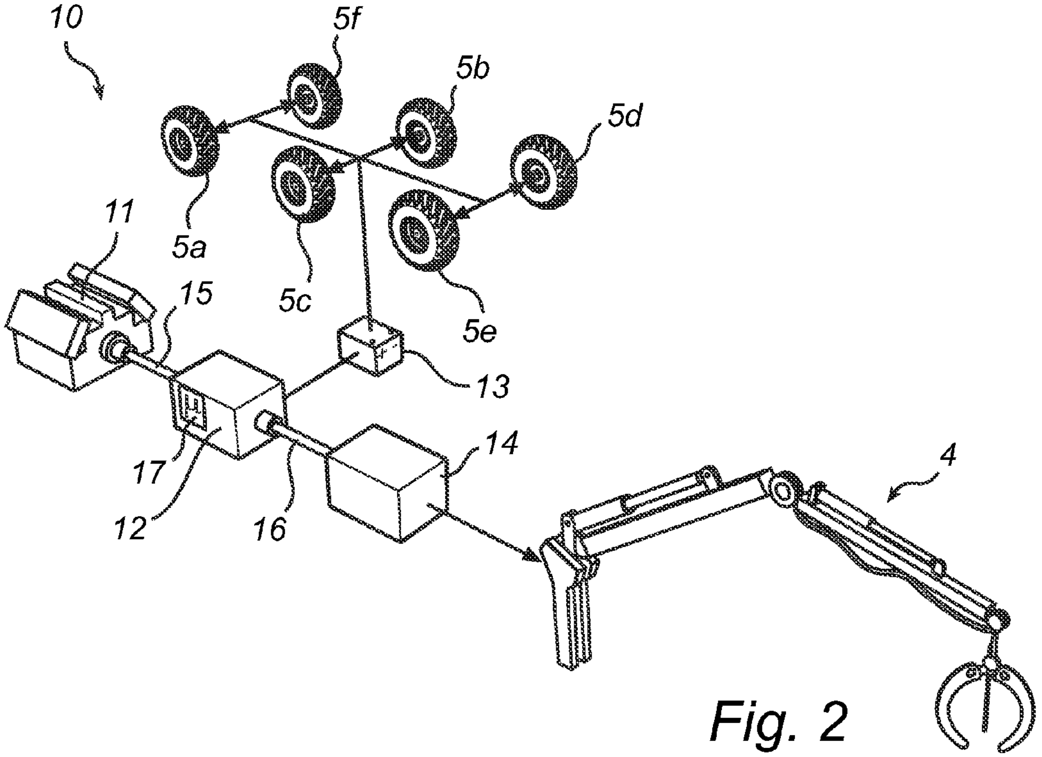
FIG. 2 is a block diagram schematically illustrating an embodiment of the energy system comprised in the hybrid vehicle of FIG. 1.

FIG. 2 is a block diagram schematically illustrating an embodiment of the energy system comprised in the hybrid forwarder 1 in FIG. 1.

With reference to FIG. 2, the energy system 10 comprises a combustion engine 11, which may advantageously be provided in the form of an engine running on diesel or biofuel, an electric generator/motor 12, an energy storage device 13, here being schematically indicated by a single battery, and a power consuming device in the form of a hydraulic pump 14 for powering the grabbing tool 4 of the hybrid forwarder 1 in FIG. 1.

As is indicated in FIG. 2, the combustion engine 11, the electric generator/motor 12 and the hydraulic pump 14 are mechanically connected by shafts 15, 16, which cause movable parts of the combustion engine 11, the electric generator/motor 12 and the hydraulic pump 14 to rotate at the same rotational speed—the actual engine rotational speed, $RPM_{actual}$. It should be noted that the present invention is equally applicable for energy systems having an indirect mechanical connection between the different parts of the energy system 10, such as via one or several gear-boxes or similar.

As is also schematically illustrated in FIG. 2, the electric generator/motor 12 is electrically connected to the energy storage device 13, which in turn provides electric energy to the electric motors driving the wheels 5*a-f* of the forwarder 1. It should be noted that the electric generator/motor 12 may also supply electric power directly to the electric motors driving the wheels 5*a-f*.

To control operation of the energy system 10, the energy system 10 is provided with a controller 17, which in the exemplary embodiment schematically illustrated by FIG. 2 is shown as a micro-processor associated with the electric generator/motor 12.

Having now described the basic configuration of an exemplary energy system according to an embodiment of the present invention, an embodiment of the control method implemented by the controller 17 will be described below with reference to the schematic flow chart in FIG. 3.

Figure 3:
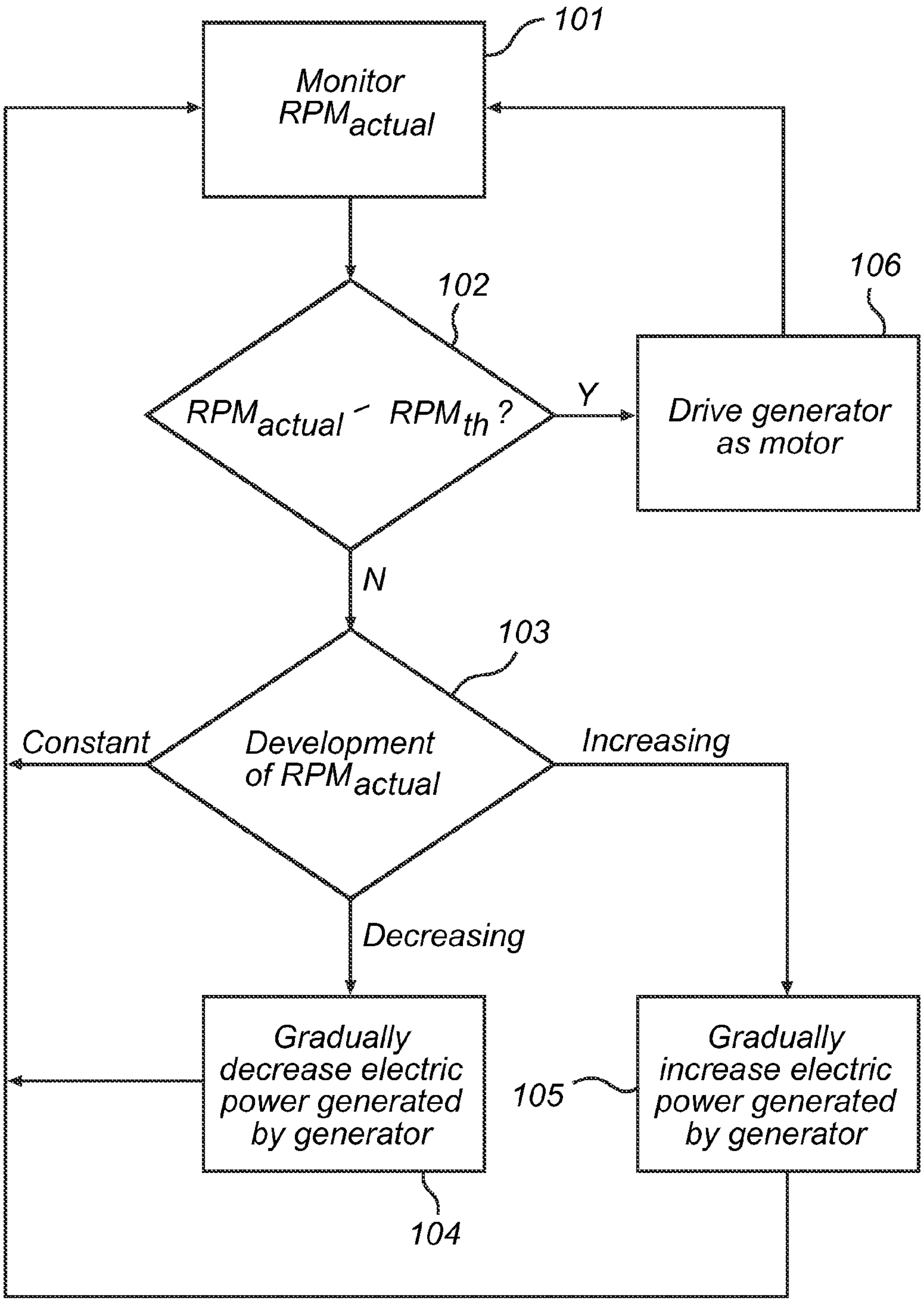
FIG. 3 is a flow-chart schematically illustrating an energy system control method according to an embodiment of the present invention.

Referring to FIG. 3, the actual engine rotational speed $RPM_{actual}$ is monitored by the controller 17 in a first step 101. The actual engine rotational speed $RPM_{actual}$ may be monitored by repeatedly acquiring data indicative of the actual engine rotational speed $RPM_{actual}$. This may, for example, be achieved by acquiring signals from one or several sensors sensing the rotational speed of the crank shaft of the combustion engine 11, the rotor of the electric generator/motor 12, the hydraulic pump 14 or any of the shafts 15, 16 mechanically connecting the main parts of the energy system 10.

In the next step 102, the monitored actual engine rotational speed $RPM_{actual}$ is compared with a predetermined threshold engine rotational speed $RPM_{th}$. If the actual engine rotational speed $RPM_{actual}$ is greater than the threshold engine rotational speed $RPM_{th}$, the method proceeds to step 103, where the development over time of the actual engine rotational speed $RPM_{actual}$ is evaluated. The actual engine rotational speed $RPM_{actual}$ may remain constant, decrease or increase.

If it is determined in step 103 that the actual engine rotational speed $RPM_{actual}$ is constant, then the process returns to step 101 and continues to monitor the actual engine rotational speed $RPM_{actual}$.

If it is determined in step 103 that the actual engine rotational speed $RPM_{actual}$ is decreasing, then the process proceeds to step 104 and controls the electric generator/motor 12 to gradually decrease the electric power output by the electric generator/motor 12. Thereafter, the process returns to step 101 and continues to monitor the actual engine rotational speed $RPM_{actual}$.

If it is determined in step 103 that the actual engine rotational speed $RPM_{actual}$ is increasing, then the process proceeds to step 105 and controls the electric generator/motor 12 to gradually increase the electric power output by the electric generator/motor 12. Thereafter, the process returns to step 101 and continues to monitor the actual engine rotational speed $RPM_{actual}$.

If, on the other hand, it is determined in step 102 that the actual engine rotational speed $RPM_{actual}$ is less than the threshold engine rotational speed $RPM_{th}$, the method proceeds to step 106 and controls the electric generator/motor 12 to function as an electric motor converting electric power drawn from the energy storage device 13 to mechanical power supplied to the hydraulic pump 14 via the shaft 16 connecting the electric generator/motor 12 and the hydraulic pump 14. Thereafter, the process returns to step 101 and continues to monitor the actual engine rotational speed $RPM_{actual}$.

After now having described an embodiment of the energy system control method according to the present invention in general terms, operation of the energy system described above in connection with FIG. 2 will be described below with reference to the schematic diagrams in FIGS. 4*a-c*.

Figure 4A:
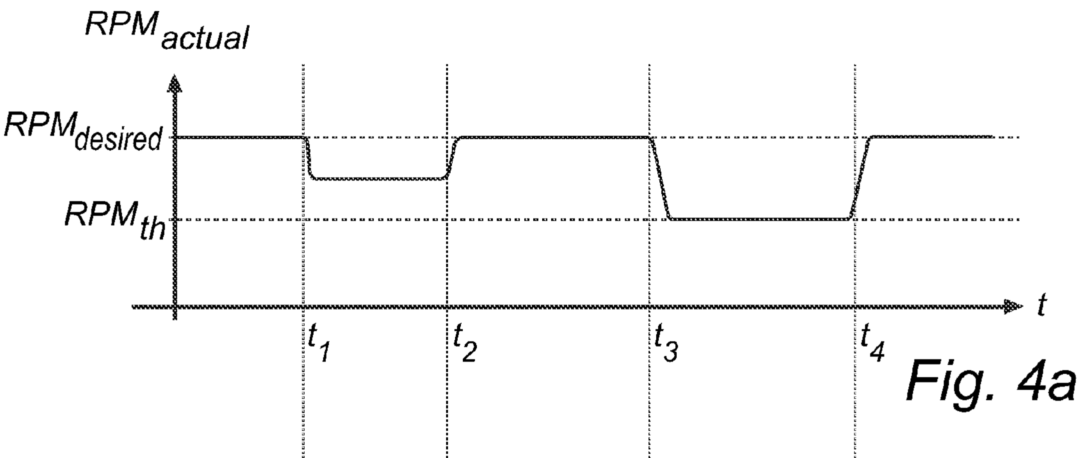
FIGS. 4*a-c* are diagrams schematically illustrating operation of the energy system in FIG. 2 in an exemplary scenario.
Figure 4B:
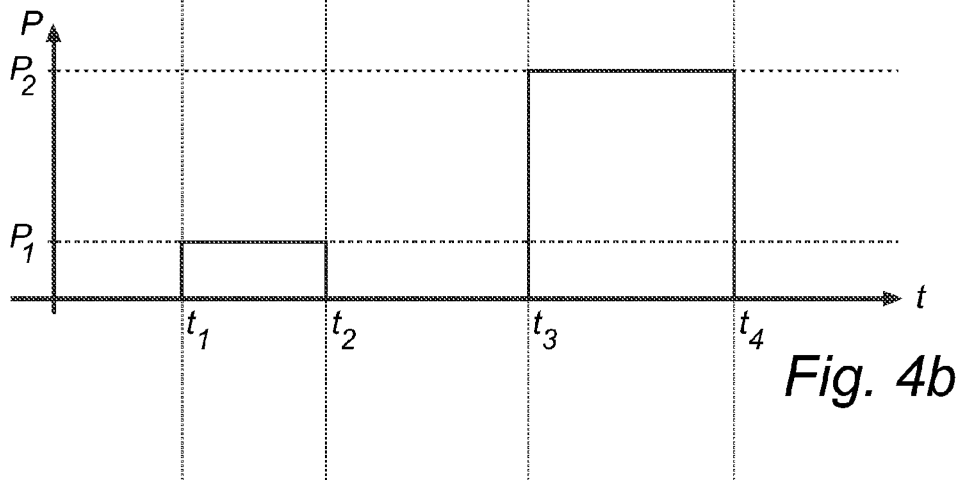
Figure 4C:
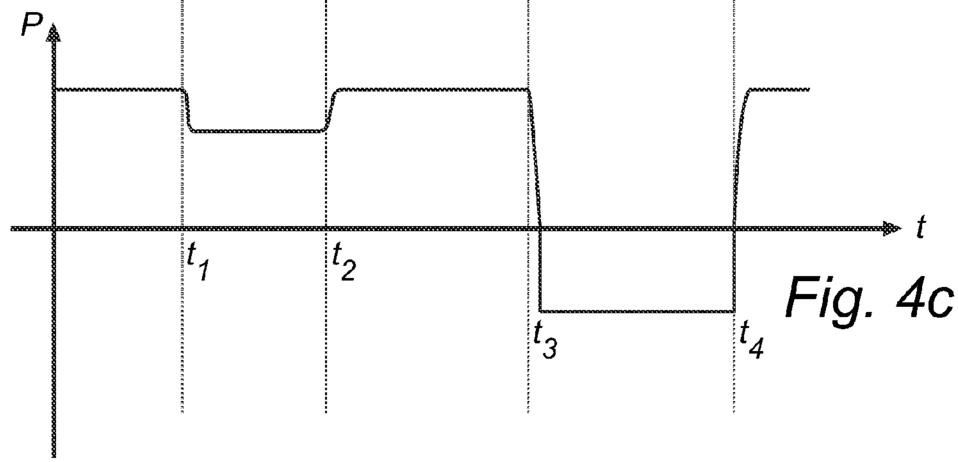

The diagram in FIG. 4*b* schematically illustrates the power consumption of the hydraulic pump 14 as a function of time for an exemplary sequence of operations of the forwarder 1 in FIG. 1, the diagram in FIG. 4*a* schematically illustrates the actual engine rotational speed as a function of time, and the diagram in FIG. 4*c* schematically illustrates the output of electric power from the electric generator/motor 12.

Before the first event occurring at the time $t_1$ indicated in FIGS. 4*a-c*, the combustion engine 11 runs at the desired engine rotational speed $RPM_{desired}$, the hydraulic pump 14 consumes a very low standby power, and the electric generator/motor 12 receives practically all of the mechanical power provided by the combustion engine 11 and converts this power to generated electric power, which is output to the energy storage device 13.

As can be seen in FIG. 4*b*, there is an increase in the power consumption of the hydraulic pump 14 at time $t_1$, where the power consumption increases from the standby power to power $P_1$. This increase in the power consumption of the hydraulic pump 14 may typically result from an operator action, such as turning the forwarder 1, operating the grabbing tool 4, elevating the cabin 2 etc.

When the power consumption of the hydraulic pump 14 increases, there will momentarily be a demand for more power than the combustion engine 11 can deliver, which results in a drop in the actual engine rotational speed $RPM_{actual}$ as is schematically illustrated in FIG. 4*a*.

The actual engine rotational speed $RPM_{actual}$ is, as was described above in connection with the flow-chart in FIG. 3, monitored by the controller 17, which will control the electric generator/motor 12 to gradually reduce the generated electric power output by the electric generator/motor 12, as is schematically illustrated in FIG. 4*c*. The output of electric power from the electric generator/motor 12, and thus the mechanical power consumed by the electric generator/motor 12 will be gradually reduced until a steady-state is reached where the power provided by the combustion engine 11 corresponds to the power consumed by the electric generator/motor 12 and the hydraulic pump 14. In the presently illustrated example, this steady-state lasts until the time $t_2$, when the power consumption of the hydraulic pump 14 again falls back to the standby power.

As a result of the reduction of the power consumption of the hydraulic pump 14, the total power consumption of the energy system 10 falls. This allows the engine control system of the combustion engine to gradually increase the actual engine rotational speed $RPM_{actual}$ until the desired engine rotational speed $RPM_{actual}$ is reached, as is indicated in FIG. 4*b*.

The actual engine rotational speed $RPM_{actual}$ is monitored by the controller 17, which, as is schematically indicated in FIG. 4*c*, controls the electric generator/motor 12 to output a gradually increasing generated electric power to the energy storage device 13.

At time $t_3$, there is again, as can be seen in FIG. 4*a*, an increase in the power consumption of the hydraulic pump 14, where the power consumption increases from the standby power to power $P_2$, which is higher than the maximum power that can be provided by the combustion engine 11. This increase in the power consumption of the hydraulic pump 14 may, for example, result from a combination of operator actions, such as simultaneously operating the grabbing tool 4 to lift a heavy load and elevating the cabin 2 etc.

When the power consumption of the hydraulic pump 14 increases, there will again momentarily be a demand for more power than the combustion engine 11 can deliver, which results in a drop in the actual engine rotational speed $RPM_{actual}$ as is schematically illustrated in FIG. 4*b*.

In response to the decreasing actual engine rotational speed $RPM_{actual}$, the controller 17 will again control the electric generator/motor 12 to output a gradually reducing electric power to the energy storage device 13. Since the hydraulic pump 14 this time requires more power than the combustion engine 11 can deliver, no steady state is achieved. Instead, the actual engine rotational speed $RPM_{actual}$ continues to drop as far as to the predetermined threshold engine rotational speed $RPM_{th}$. This is detected by the controller 17, which in response thereto controls the electric generator/motor 12 to function as an electric motor drawing electric power from the energy storage device 13 and supplying mechanical power to the hydraulic pump 14. Hereby, the combustion engine 11 is prevented from stalling, and the hydraulic pump 14 is provided with the mechanical power it needs from the combustion engine 11 and the electric generator/motor 12 together.

As is illustrated in FIG. 4*a*, the power consumption of the hydraulic pump 14 again falls back to the standby power at the time $t_4$.

As a result of the reduction of the power consumption of the hydraulic pump 14, the total power consumption of the energy system 10 falls. This allows the engine control system of the combustion engine to gradually increase the actual engine rotational speed $RPM_{actual}$ until the desired engine rotational speed $RPM_{actual}$ is reached, as is indicated in FIG. 4*b*.

The actual engine rotational speed $RPM_{actual}$ is monitored by the controller 17, which, as is schematically indicated in FIG. 4*c*, controls the electric generator/motor 12 to switch back to its generator state and output a gradually increasing generated electric power to the energy storage device 13.

Although the changes in the power consumption of the hydraulic pump 14 are indicated in FIG. 4*a* as being substantially instantaneous, this is for illustrative purposes only.

The person skilled in the art realizes that the present invention by no means is limited to the preferred embodiments described above. For example, the controller 17 may be positioned anywhere in the hybrid vehicle 1, or may be comprised of distributed logic.

I claim:

1. A method of controlling operation of an energy system for a hybrid vehicle, the energy system comprising:

a combustion engine being controlled to work at a desired engine rotational speed;

an electric generator/motor arranged to be driven by the combustion engine to output a generated electric power;

a power consuming device arranged to be driven by the combustion engine and drivable by said electric generator/motor;

and an energy storage device connected to said electric generator/motor and arranged to receive the generated electric power output by the electric generator/motor, wherein the method comprises the steps of:

controlling said electric generator/motor to output generated electric power to said energy storage device;

monitoring an actual engine rotational speed;

and if the actual engine rotational speed decreases from said desired engine rotational speed, controlling said electric generator/motor to gradually reduce said generated electric power output to said energy storage device.

2. The method according to dam 1, further comprising the step of:

if the actual engine rotational speed increases towards said desired engine rotational speed controlling said electric generator/motor to output a gradually increasing generated electric power.

3. The method according to claim 1, further comprising the step of:

if the actual engine rotational speed is lower than a predetermined threshold engine rotational speed, controlling said electric generator/motor to function as an electric motor, drawing electric power from the energy storage device and supplying mechanical power to the power consuming device.

4. A controller for controlling operation of an energy system of a hybrid vehicle, the energy system comprising:

a combustion engine controllable to work at a desired engine rotational speed;

an electric generator/motor arranged to be driven by the combustion engine to output a generated electric power;

a power consuming device arranged to be driven by the combustion engine and drivable by said electric generator/motor;

and an energy storage device connected to said electric generator/motor and arranged to receive the generated electric power output by the electric generator/motor, the controller being configured to:

control said electric generator/motor to output generated electric power to said energy storage device;

monitor an actual engine rotational speed;

and if the actual engine rotational speed decreases from said desired engine rotational speed, control said electric generator/motor to gradually reduce said generated electric power output to said energy storage device.

5. The controller according to claim 4, further being configured to:

if the actual engine, rotational speed increases towards said desired engine rotational speed, control said electric generator/motor to output a gradually increasing generated electric power.

6. The controller according to claim 4, further being configured to:

if the actual engine rotational speed is lower than a predetermined threshold engine rotational speed, control said electric generator/motor to function as an electric motor, drawing electric power from the energy storage device and supplying mechanical power to the power consuming device.

7. An energy system for a hybrid vehicle, comprising:

a combustion engine controllable to work at a desired engine rotational speed;

an electric generator/motor arranged to be driven by the combustion engine to output a generated electric power;

a power consuming device arranged to be driven by the combustion engine and drivable by said electric generator/motor;

an energy storage device connected to said electric generator/motor and arranged to receive the generated electric power output by the electric generator/motor, and a controller configured to:

control said electric generator/motor to output said generated electric power to sad enemy storage device; and monitor an actual engine rotational speed;

if the actual engine rotational speed decreases from said desired engine rotational speed, control said electric generator/motor configured to gradually reduce said generated electric power output to said energy storage device.

8. The enemy system according to claim 7, wherein said electric generator/motor and said power consuming device are mechanically connected to said combustion engine to be driven by the combustion engine at the actual engine rotational speed.

9. The energy system according to claim 8, wherein said combustion engine, said electric generator/motor and said power consuming device are arranged in an in-line arrangement and are interconnected with shafts.

10. The energy system according to claim 7, wherein said power consuming device is a pump for a hydraulic system.

11. The energy system according to claim 7 further comprising:

a set of driving wheels;

and at least one driving electric motor for driving said set of driving wheels, said electric motor being arranged to receive electric power from the energy storage device comprised in the energy system.

12. The energy system according to claim 11, comprising a plurality of individually controllable, driving electric motors, each being arranged to drive a corresponding one of said driving wheels.

13. The energy system according to claim 11, further comprising a hydraulic system arranged to be powered by the power consuming device comprised in the energy system of the hybrid vehicle.

14. The energy system according to claim 13, wherein said hydraulic system comprises a hydraulic lifting tool.

* * * * *